(12) United States Patent
Alnås et al.

(10) Patent No.: US 11,758,457 B2
(45) Date of Patent: Sep. 12, 2023

(54) RELOCATION OF MULTI-USER EDGE APPLICATIONS

(71) Applicant: Sony Corporation, Tokyo (JP)

(72) Inventors: Svante Alnås, Lund (SE); Linh Trang, Aakarp (SE)

(73) Assignee: SONY GROUP CORPORATION, Tokyo (JP)

( * ) Notice: Subject to any disclaimer, the term of this patent is extended or adjusted under 35 U.S.C. 154(b) by 140 days.

(21) Appl. No.: 16/961,037

(22) PCT Filed: Jan. 14, 2019

(86) PCT No.: PCT/EP2019/050787
§ 371 (c)(1),
(2) Date: Jul. 9, 2020

(87) PCT Pub. No.: WO2019/138104
PCT Pub. Date: Jul. 18, 2019

(65) Prior Publication Data
US 2020/0351745 A1 Nov. 5, 2020

(30) Foreign Application Priority Data
Jan. 12, 2018 (SE) .................................. 1830009-5

(51) Int. Cl.
| H04W 8/08 | (2009.01) |
|---|---|
| H04L 29/08 | (2006.01) |
| H04W 4/50 | (2018.01) |
| H04W 64/00 | (2009.01) |
| H04W 36/00 | (2009.01) |
| H04W 40/20 | (2009.01) |

(Continued)

(52) U.S. Cl.
CPC ....... *H04W 36/28* (2013.01); *H04W 36/0009* (2018.08); *H04W 36/38* (2013.01)

(58) Field of Classification Search
CPC .. H04W 36/28; H04W 36/0009; H04W 36/38
See application file for complete search history.

(56) References Cited

U.S. PATENT DOCUMENTS

| 9,513,979 B2* | 12/2016 | Kraljic | ................... G06Q 10/06 |
| 2013/0212212 A1* | 8/2013 | Addepalli | ............. G06F 9/4856 |
| | | | 709/217 |

(Continued)

OTHER PUBLICATIONS

International Search Report from corresponding International Application No. PCT/SE2019/050787, dated Apr. 16, 2019, 3 pages.

(Continued)

*Primary Examiner* — Luat Phung
(74) *Attorney, Agent, or Firm* — TUCKER ELLIS LLP (57) ABSTRACT

A method of operating a source edge computing server (201) of an edge-computing system (200), comprising: based on a first user context (861) of a first user, a second user context (862) of a second user, and a group context (865) of the first user and the second user available to the source edge computing server (201): executing a multi-user edge computing application for the first user and the second user; and relocating the first user context (861) from the source edge computing server (201) to a target edge computing server (202); and providing the group context (865) from the source edge computing server (201) to the target edge computing server (202).

10 Claims, 8 Drawing Sheets

(51) Int. Cl.
*H04W 36/28* (2009.01)
*H04W 36/38* (2009.01)

(56) References Cited

U.S. PATENT DOCUMENTS

| 2013/0318207 | A1* | 11/2013 | Dotter | H04L 29/08117 |
| | | | | 709/219 |
| 2018/0351824 | A1* | 12/2018 | Giust | G06F 9/45558 |
| 2019/0387401 | A1* | 12/2019 | Liao | H04W 8/08 |
| 2020/0059777 | A1* | 2/2020 | Drevö | H04W 48/18 |

OTHER PUBLICATIONS

Trang, Linh et al., "MECO21—Discussion on different types of context", MEC(18)000014, Jan. 12, 2018, 4 pages.
ETSI, "Mobile Edge Computing (MEC); End to End Mobility Aspects", ETSI GR MEC 016 V1.1.1, Oct. 18, 2017, 51 pages.
Samsung, "Mobility scenario analysis for D2D", 3GPP TSG RAN WG3 Meeting #83, R3-140150, Feb. 10-14, 2014, 4 pages.
Li, Alice et al., "MECO21—Discussion on MEC support for application mobility", MEC(18)000005, Jan. 4, 2018, 7 pages.

* cited by examiner

RELOCATION OF MULTI-USER EDGE APPLICATIONS

TECHNICAL FIELD

Various examples of the invention generally relate to edge computing. Various examples of the invention specifically relate to relocating multi-user edge applications between mobile edge servers. A group context of the multi-user edge application can be copied or relocated.

BACKGROUND

European Telecommunications Standards Institute (ETSI) industry specification group (ISG) on multi-access edge computing (MEC; sometimes also mobile edge computing) aims to provide information technology (IT) and cloud-computing capabilities close to the edge of a network, e.g., at the access network (AN) of a network. Due to the close proximity between MEC hardware such as MEC servers and the user equipment (UE; or terminal), MEC facilitates low latency applications. MEC is an example implementation of edge computing (EC). EC, in general, facilitates low-latency EC applications.

MEC is described in Mobile-Edge Computing—Introductory Technical White Paper, September 2014 (Contributors: Huawei, IBM, Intel, Nokia Networks, NTT DOCOMO, Vodafone), which is hereby incorporated herein by reference in its entirety by cross-reference. MEC is further described by ETSI ITS (14)01_038: ISG MEC #1 Minutes of Plenary Meeting, which is also hereby incorporated herein by reference in its entirety.

For example, due to the mobility of the terminal, relocation of applications or specifically user contexts between different EC servers may be required. For example, due to user mobility, the EC system may detect that the current EC server executing the EC application as a host (source EC server) is not optimal and may need to relocate—sometimes also referred to as migrating or transferring—the EC application or, at least, a given user context of the EC application to a new EC server (target EC server). The target EC server may be more appropriate in terms of, e.g., geographical location, load balancing, latency etc. if compared to the source EC server. For facilitating such relocation in view of UE mobility, sometimes a control node of the EC system—also referred to as orchestrator node—is employed. The control node may track mobility of the UE and may control the relocation, e.g., to avoid or reduce impacts on the user experience associated with the application. Generally, the control node—beyond mobility management—may be responsible for further control functionality.

Some EC applications involve participation of multiple users. Such multi-user EC applications may include, e.g., video conferencing between multiple users, online games with multiple players, etc. For example, in a video game, several players are playing in the same level and they are able to see each other in the game. A further example includes a multi-user chatroom.

It has been observed that relocation in a multi-user EC application scenario faces certain restrictions and drawbacks. For example, a flexibility in relocation may be limited, e.g., if the user contexts for multiple users have to be relocated one after another. Furthermore, control signaling overhead can be significant when relocating in a multi-user EC application scenario.

SUMMARY

Therefore, a need exists for advanced EC techniques. Specifically, a need exists for EC techniques which overcome or mitigate at least some of the above-identified restrictions and drawbacks.

This need is met by the features of the independent claims. The features of the dependent claims define embodiments.

A method of operating a source EC server of an EC system includes executing a multi-user EC application for a first user and a second user. Said executing is based on a first user context of the first user and a second user context of a second user and a group context of the first user and the second user. The method also includes relocating the first user context from the source EC server to a target EC server. The method also includes providing the group context from the source EC server to the target EC server.

By providing the group context from the source EC server to the target EC server, it is possible to facilitate full or partial relocation of the multi-user EC application at low latency and with limited control-signaling overhead.

A computer program or a computer program product includes program code. The program code can be executed by at least one processor. Executing the program code causes the at least one processor to perform a method of operating a source EC server of an EC system. The method includes executing a multi-user EC application for a first user and a second user. Said executing is based on a first user context of the first user and a second user context of a second user and a group context of the first user and the second user. The method also includes relocating the first user context from the source EC server to a target EC server. The method also includes providing the group context from the source EC server to the target EC server.

A source EC server of an EC system, the source EC server comprising control circuitry configured to perform: based on a first user context of a first user, a second user context of a second user, and a group context of the first user and the second user available to the source EC server: executing a multi-user EC application for the first user and the second user; and relocating the first user context from the source EC server to a target EC server; and providing the group context from the source EC server to the target EC server.

A method of operating a target EC server of an EC system includes relocating a first user context of a first user of a multi-user EC application from a source EC server to the target EC server. The method also includes obtaining a group context of the first user and of a second user of the multi-user EC application from the source EC server. The method also includes executing the multi-user EC application for the first user, based on the first user context and the group context available to the target EC server.

By obtaining the group context from the source EC server to the target EC server, it is possible to facilitate full or partial relocation of the multi-user EC application at low latency and with limited control-signaling overhead.

A computer program or a computer program product includes program code. The program code can be executed by at least one processor. Executing the program code causes the at least one processor to perform a method of operating a target EC server of an EC system. The method includes relocating a first user context of a first user of a multi-user EC application from a source EC server to the target EC server. The method also includes obtaining a group context of the first user and of a second user of the multi-user EC application from the source EC server. The method also includes executing the multi-user EC application for the first user, based on the first user context and the group context available to the target EC server.

A target EC server of an EC system, the target EC server comprising control circuitry configured to perform: relocating a first user context of first user of a multi-user EC application from a source EC server to the target EC server; and obtaining a group context of the first user and of a second user of the multi-user EC application from the source EC server; and based on the first user context and the group context available to the target EC server: executing the multi-user EC application for the first user.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

In the following, examples of the invention will be described in detail with reference to the accompanying drawings. It is to be understood that the following description of examples is not to be taken in a limiting sense. The scope of the invention is not intended to be limited by the examples described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of EC are described. EC can facilitate providing ultra-low latency applications to UEs. An EC system providing EC applications is often associated with access nodes such as base stations (BSs) or access points of a wireless network. An example of a wireless network is a cellular network. For example, EC often relies on deployment of EC servers on which an EC application is executed within a radio AN (RAN) or close to equipment of a RAN of a cellular network. For example, the EC servers may be co-located with BSs of the RAN. EC systems may also be implemented for fixed-wire networks. For example, the EC servers may be operated by the same operator as the associated network. For example, the EC servers may have a high-throughput backbone connection to the AN. For example, the EC servers may offer applications such as cloud-based computing. The EC applications offered by the EC servers to a UE may benefit from low latency. For example, the latency may be less than 30 ms, optionally less than 10 ms. Due to such low latency, latency-sensitive applications may be provided. For example, the EC applications may relate to server-based gaming or augmented reality.

An example use case for an EC system includes virtual-reality 3-D EC applications hosted by the EC server; such techniques may enable VR applications also on simpler UEs, such as lower end mobile phones. VR typically requires a very low latency feedback loop between the user input, e.g., moving the head, and the rendered VR 3D frames being shown on the display, e.g., the display in VR glasses. Preferably the total system round trip latency should be less than 10 ms. The EC servers, being placed closer to the users, have the potential to enable low latency applications such as VR.

A further example use case for an EC system includes videoconference EC applications hosted by the EC server. Other EC applications may not be low-latency related and may rather focusing on, e.g., reducing bandwidth etc. A further example use case for an EC system includes multi-user gaming EC applications.

In some examples, the EC servers together with an EC control node implement an EC system. An EC system may have one or more proxy nodes that facilitate access by UEs. For example, the EC control node may perform control functionality with respect to the EC servers. Such control functionality may include: facilitating and, in particular, triggering relocation of EC applications between the EC servers of the EC system, i.e., from a source EC server to a target EC server; load balancing; deployment of additional EC servers; etc.

According to various examples, relocation of an EC application from a source EC server to a target EC server is described. Relocation can correspond to at least partly moving execution of the EC application from the source EC server to the target EC server, during runtime of the EC application.

In one example, in response to fully relocating the EC application from the source EC server to the target EC server, execution of the EC application at the source EC server stops. Fully relocating corresponds to moving the EC application. However, in further scenarios, the EC application is partly relocated from the source EC server to the target EC server; then, both, the source EC server, as well as the target EC server may be executing the EC application, e.g., for different users in case of a multi-user EC application. Such partial relocation may also be referred to as copying the EC application.

In greater detail, according to various examples, the user context of one or more users of a multi-user EC application is relocated from the source EC server to the target EC server. These users are relocated. The user contexts of one or more further users of the multi-user EC application may remain at the source EC server. These one or more further users are not relocated. Then, in response to this relocation, the multi-user EC application is executed, both, at the source EC server, as well as the target EC server, for different users. Hence, both the source EC server, as well as the target EC server can host the EC application.

According to various examples, such partial or full relocation of the multi-user EC application is facilitated by relying on a group context of the multi-user EC application.

The group context is different from the user contexts. For example, values of one or more group-specific parameters of the group context may be shared between EC servers executing the multi-user EC application for different users. There may be shared access the values of the group-specific parameters. Hence, a single value per group-specific parameter may be sufficient for executing the EC application. This may be in contrast to the user contexts. Here, values of user-specific parameters of user contexts of different users of the multi-user EC application may not be shared between EC servers executing the multi-user EC application for the different users. Multiple values may be required for a given parameter, because the value may differ from user to user. To provide an example, the group-specific parameters for a videoconferencing EC application may include: server address of a central server hosting the video conference; time duration of the video conference; number of participants of the video conference; shared documents available to all users of the video conference; etc. It will be appreciated that such group-specific parameters do not vary from user to user. Examples of user-specific parameters of the videoconferencing EC application include: compression standard used for the back-end connection of each computer of the various users; individual connection time of each user; proprietary data associated with each user; user name; etc. Here, e.g., the user name takes different values for different user contexts.

According to various examples, the group context is provided from the source EC server to the target EC server. Thereby, the target EC server obtains the group context. Based on the group context provided by the source EC server and obtained by the target EC server, the target EC server can commence executing the multi-user EC application. By relying on the group context when relocating, it is possible to reduce control signaling overhead and reduce complexity. This, in turn, also helps to reduce latency.

Hence, in other words, according to various examples, an interface between EC servers is defined which supports transmission of the group context. Specifically, such an interface may be implemented on application-level. The EC application level may be defined in the EC servers; the interface may be logically defined on the same protocol stack layer as the EC application. Thus, the EC application itself may check whether the group context is available at the target EC server. According to various examples, said providing of the group context by the source EC server may include control signaling between the source EC server and the target EC server, e.g., is part of a negotiation whether providing of the group context is required. For example, according to certain implementations, it may be determined whether the group context is already available to the target EC server. Upon the determining being negative, i.e., if the group context is not available to the target EC server, it is possible to provide the group context to the target EC server. Hence, if the user context for a given user of the multi-user EC application is relocated and the group context of the multi-user EC application is not yet available to the target EC server to which the user context is relocated, then it is possible to provide the group context to the target EC server. Such determining whether the group context is available to the target EC server may include control signaling between the source EC server and the target EC server. Again, this control signalling may logically be implemented on the same protocol stack layer as the EC application. Hence, different instances of the EC application—being executed by the various EC servers including the source EC server and the target EC server—can determine whether the group context is already available to the target EC server. For example, a request/response message pair may be exchanged between the source EC server and the target EC server. This reduces overall control signaling overhead, because unnecessary provisioning of group context may be avoided.

Figure 1:
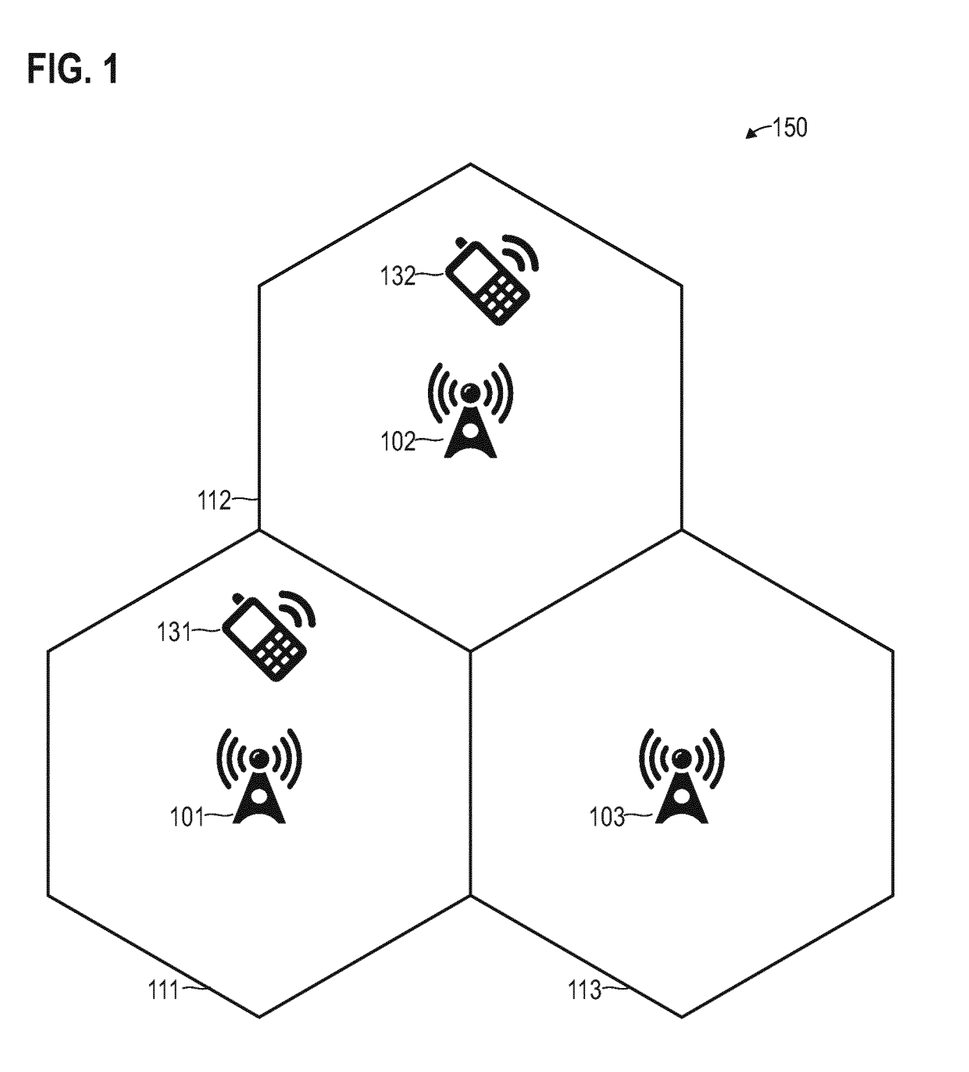
FIG. 1 schematically illustrates a radio access network of a cellular network according to various examples.

FIG. 1 illustrates aspects with respect to the cellular network. In particular, FIG. 1 illustrates aspects with respect to a RAN 150 of the cellular network. In the example of FIG. 1, three BSs 101-104 form the RAN 150. In other examples, a larger number of BSs could be used.

While various examples are described herein in the context of cellular networks, respective techniques may also be applied for other types of networks, e.g., adhoc wireless networks or fixed-wire networks.

Example implementations include 3GPP-specified networks such as 4G or 5G and WLAN or LAN.

The BS 101 serves a cell 111 of the cellular network. As such, the BS 101 is sometimes referred to as serving BS for UEs 131 located within the cell 111 and connected with the cellular network via the BS 101. The BS 102 serves and adjacent cell 112 and, hence, is the serving BS 101 for the UE 132. Also, the BS 103 serves an adjacent cell 113.

Due to mobility of the UE 131, the UE 131 may at one point in time come close to the cell edge of the cell 111. Typically, in such a cell edge scenario, the quality of communicating on a radio channel between the UE 131 and the BS 101 deteriorates. For example, at one point in time the quality of communicating on the radio channel may fall below a certain threshold. This may be due, e.g., the UE 131 moving away from the BS 101 and towards the BS 102. Then, a handover from the initially serving BS 101—which, in the context of the handover is often referred to as the source BS—to the BS 102 (target BS) may occur. Once the handover is completed, the UE 131 is connected with the cellular network via the BS 102, which is then the new serving BS. Handovers, or generally the mobility of the UE 131, can be one example why a relocation of the EC application can be required.

Figure 2:
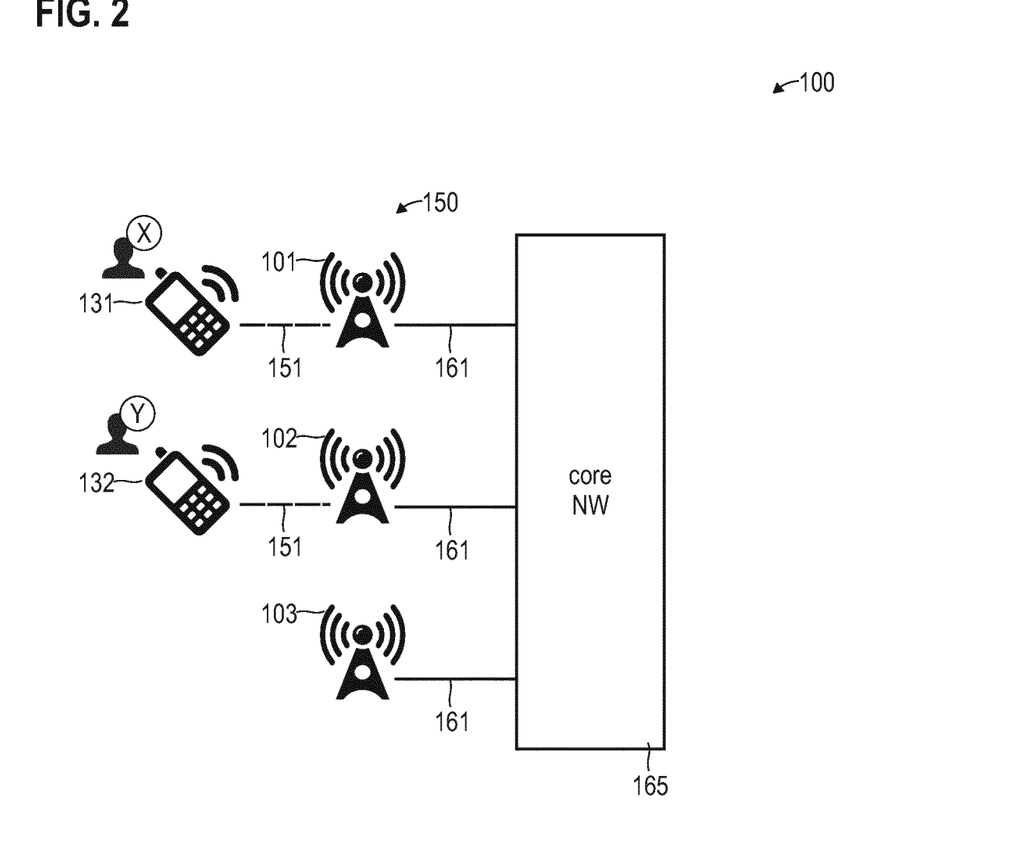
FIG. 2 schematically illustrates the cellular network of FIG. 1 in greater detail.

FIG. 2 illustrates aspects with respect to the cellular network 100. In FIG. 2, the wireless link 151 via which the UE 131 is communicating with the BS 101 is illustrated. The communication on the wireless link 151 can be bidirectional including downstream communication from the BS 101 to the UE 132 and upstream communication from the UE 131 to the BS 101. This also applies for the UE 131.

FIG. 2 illustrates a core network 165 of the cellular network 100. The BSs 103 are connected by core network interfaces 161 with each other and the core network 165.

Figure 3:
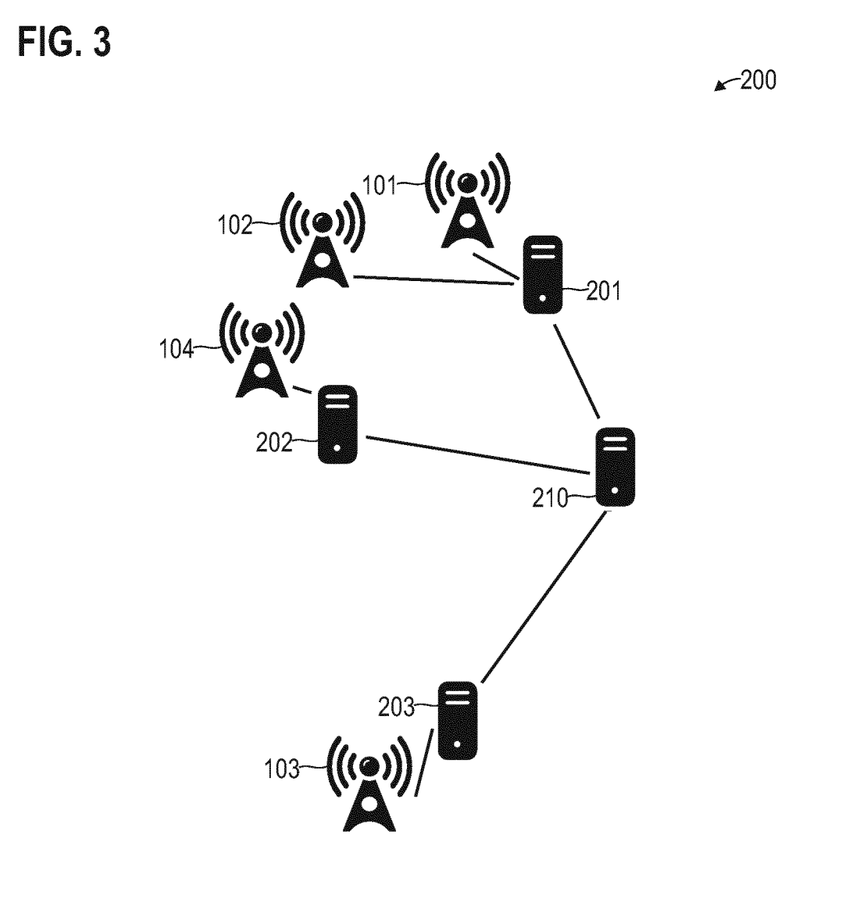
FIG. 3 schematically illustrates an EC system associated with the cellular network according to various examples.

FIG. 3 illustrates aspects with respect to an EC system 200. The EC system 200 is associated with the RAN 150 of the network 100. The EC system 200 includes EC servers 201-203. The EC server 201 is associated with the BS 101 and with the BS 102; the EC server 202 is associated with a further BS 104; and the EC server 203 is associated with the BS 103. Applications hosted by a given one of the EC servers 201-203 are typically provided to UEs connected to the respectively associated BS 101-103.

For example, the EC servers 201-203 could be co-located at the same site as the associated BS 101-104. By deploying the EC servers 201-203 in or close to the RAN 150, a comparably low latency for communicating between the EC servers 201-203 and the associated BSs 101-104 may be achieved. For example, the latency of communicating between a given EC server 201-203 and the associated BS 101-104 may be below 30 milliseconds, preferably below 10 microseconds, more preferably below 1 microsecond. Sometimes, such a dimensioning of the latency is also referred to as ultra-low latency.

Control of the EC system 200 is provided by an EC control node 210. For example, the local control node 210 can perform tasks of load balancing between the various EC servers 201-203. For example, the local control node 210 can keep track of a computational load imposed to the various EC servers 201-203. For example, the local control node 210 can control relocation of EC applications between the various EC servers 201-203 and, hence, implement mobility management.

For example, the local control node 210 can perform tasks with respect to relocating an application from a source EC server 201-203 to a target EC server 201-203 of the EC system 200. For example, relocation of the EC application may be triggered due to mobility of the UE to which the EC application is provided. For example, relocation of the EC application may be due to a handover between cells 111-113 of the radio access network 150 of the cellular network 100. For example, relocation of the EC application may be triggered due to load balancing.

Figure 4:
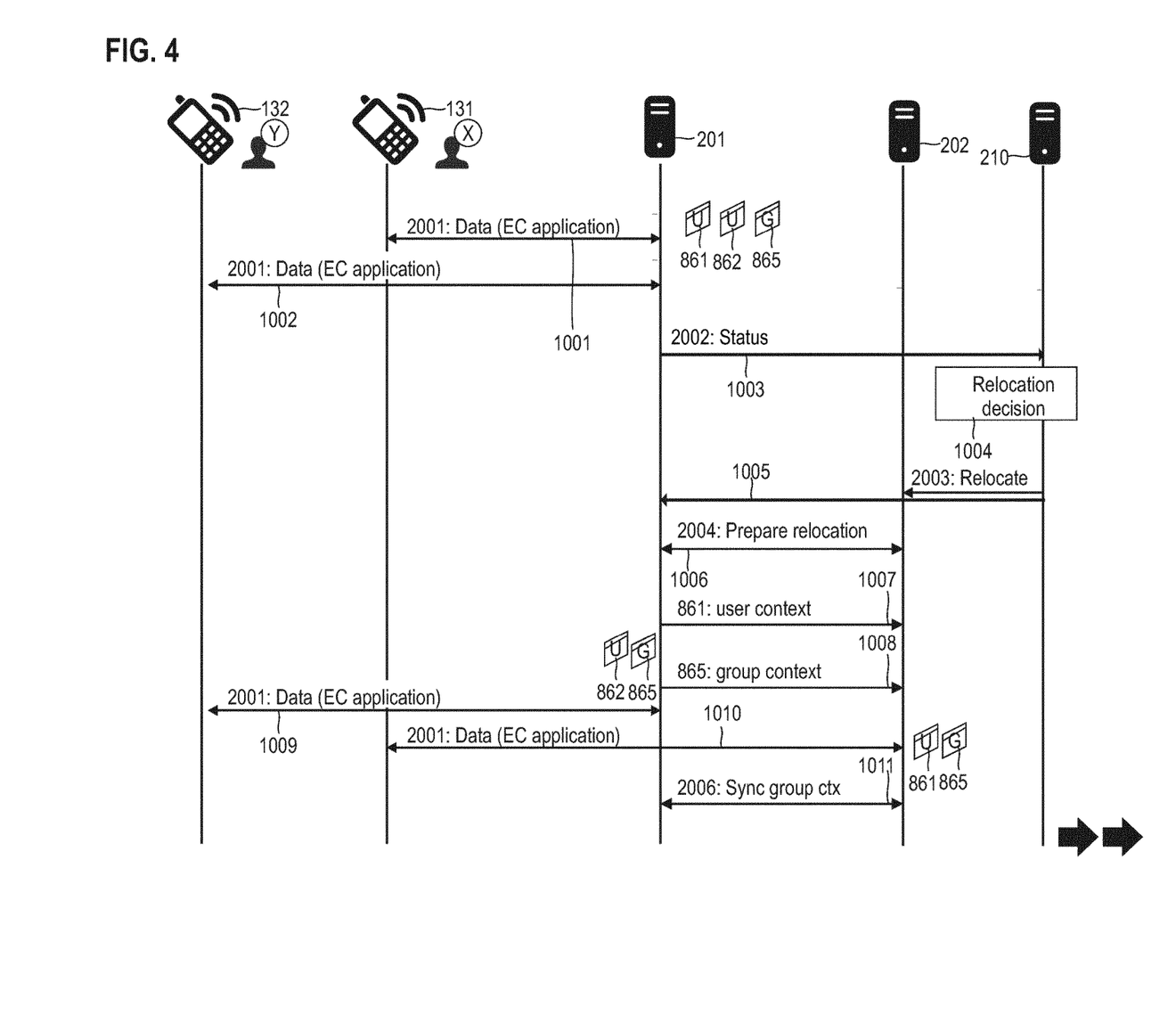
FIG. 4 is a signaling diagram associated with partial relocation of an EC application from a source EC server to a target EC server according to various examples.

FIG. 4 illustrates aspects with respect to relocation of an EC application. Specifically, FIG. 4 illustrates aspects with respect to relocation of a user context of the user X associated with the UE 131. As such, FIG. 4 illustrates aspects with respect to partial relocation of a multi-user EC application.

Specifically, FIG. 4 illustrates aspects with respect to the source EC server 201 providing the group context of the EC application. FIG. 4 also illustrates aspects with respect to the target EC server 202 obtaining this group context.

In FIG. 4, initially, the EC application is executed by the source EC server 201 for, both, the user X of the UE 131 and the user Y of the UE 132. The source EC server 201 executes the EC application based on the user context 861 for the user X of the UE 131, further based on the user context 862 for the user Y of the UE 132, and further based on the group context 865. The source EC server 201 hosts the EC application.

Initially, the target EC server 202 does not host the EC application.

The EC application is also executed by the UE 131 and the UE 132.

Execution of the EC application includes local processing at the devices 131, 132, 201. Execution of the EC application also involves communication of application data 2001 (sometimes also referred to as payload data or user data) between the UE 131 and the source EC server 201 at 1001 and, furthermore, between the UE 132 and the source EC server 201 at 1002. Generally, uplink application data and/or downlink application data 2001 may be communicated.

Next, at 1003, a status control message 2002 is transmitted by the source EC server 201 and received by the EC control node 210. For example, the status control message 2002 may be indicative of mobility measurements associated with the UE 131 and/or associated with the UE 132.

At 1004, the control node 210 makes a relocation decision. In detail, a decision is taken to partly relocate the EC application from the source EC server 201 to the target EC server 202. In further detail, the decision is taken to relocate the user context 861 from the source EC server 201 to the target EC server 202. This may be referred to as relocating the user X.

At 1005, the control node 210 transmits corresponding relocation control messages 2003 to the EC servers 201, 202.

As a general rule, the decision-making process and the implementation of the relocation decision and trigger according to 1003-1005 may vary in various implementations. Hence, the particular scenario illustrated in FIG. 4 is an example only. For example, in further scenarios, there may not be required an involvement of a central control node 210. The relocation decision may be taken, e.g., at the source EC server 201. For further illustration, in some scenarios, if there is involvement of the control node 210, then the control node 210 may not communicate with the target EC server 202, but merely communicate with the source EC server 201. It follows that the specific details of the decision-taking process and the implementation of the relocation are not germane of the function of the techniques described herein and may be varied in other implementations. As a further example, while in the illustrated the EC server 201 provides the control message 2002 to the control node 210, in other scenarios such a control message may be alternatively or additionally provided by other nodes of the EC system 200, e.g., a host node, a platform node, a platform manager node.

Next, at 1006, control signaling 2004 is implemented between the source EC server 201 and the target EC server 202. The control signaling 2004 is for preparing the partial relocation of the EC application. The control signaling 2004 is for preparing relocation of the user X.

For example, the control signaling 2004 can include preparation of the target EC server 202 to receive the user context 861 of the user X at 1007. 1007 corresponds to relocating the user context 861 from the source EC server 201 to the target EC server 202.

At 1008, the group context 865 is provided by the source EC server 201 to the target EC server 202. The target EC server 202, at 1008, obtains the group context 865 from the source EC server 201.

1008 and 1007 are executed within a short timeframe, i.e., time-correlated. This is to facilitate low-latency relocation.

The control signaling 2004 may also prepare this transfer of the group context 865 at 1008. For example, the control signaling 2004, at 1006, may be to determine whether the group context 865 is already available to the target EC server 202. In the scenario of FIG. 4, in response to the determining being negative, the group context 865 is the provided, at 1008, to the target EC server 202.

In the scenario of FIG. 4, the EC application is partly relocated from the source EC server 201 to the target EC server 202, but not fully relocated. Hence, the group context 865 is not deleted from the source EC server 201. The source EC server 201 rather continues to host the EC application. As such, 1008 may correspond to copying the group context 865 from the source EC server 201 to the target EC server 202, said copying resulting in multiple instances of the group context 865, a first instance at the source EC server 201 and a second instance at the target EC server 202.

The source EC server 201 may clear resources previously associated with the user context 861, in response to relocating the user context 861.

Then, the source EC server 201 can stop executing the EC application for the user X associated with the UE 131, but can continue to execute the EC application for the user Y associated with the UE 132. This is based on the user context 862 and the group context 865, i.e., the local instance of the group context 865 available to the source EC server 201.

At the same time, the target EC server 202 can commence executing the EC application for the user X associated with the UE 131 based on the relocated user context 861 as well as the instance of the group context 865 available to the target EC server 202.

As illustrated in FIG. 4, this execution of the EC application at, both, the source EC server 201 and the target EC server 202, includes communicating application data 2001 between the UE 132 and the source EC server 201 at 1009; and further includes communicating application data 2001 between the UE 131 and the target EC server 202 at 1010.

At 1011, the group context 865 is synchronized between the source EC server 201 and the target EC server 202, by means of respect of control signaling 2006. This synchronization helps to avoid divergence between the multiple instances of the group context 865 at the source EC server 201 and at the target EC server 202.

There are various techniques available to implement the synchronizing of the group context 865. For example, upon detecting a change at one of the instances of the group context 865, the correspondingly updated group context 865 may be propagated to one or more other EC servers 201, 202. Bi-directional synchronization is possible, e.g., between synchronization peers. Master/slave synchronization is possible. For example, control signaling 2006 may be implemented at the predefined timing, e.g., with a certain periodicity. As a general rule, said synchronizing may include incremental updates. For example, it may be determined which portions of the group context have changed since the last synchronization; then, the group context may be synchronized based on such determination. Incremental updates limit control signaling overhead.

In the scenario of FIG. 4, once the partial relocation of the EC application has completed, i.e., once the target EC server 202 commences execution of the EC application for the user X, it is possible to stop execution of the EC application for the user X at the source EC server 201. Corresponding resources can be released or cleared at the source EC server 201.

Figure 5:
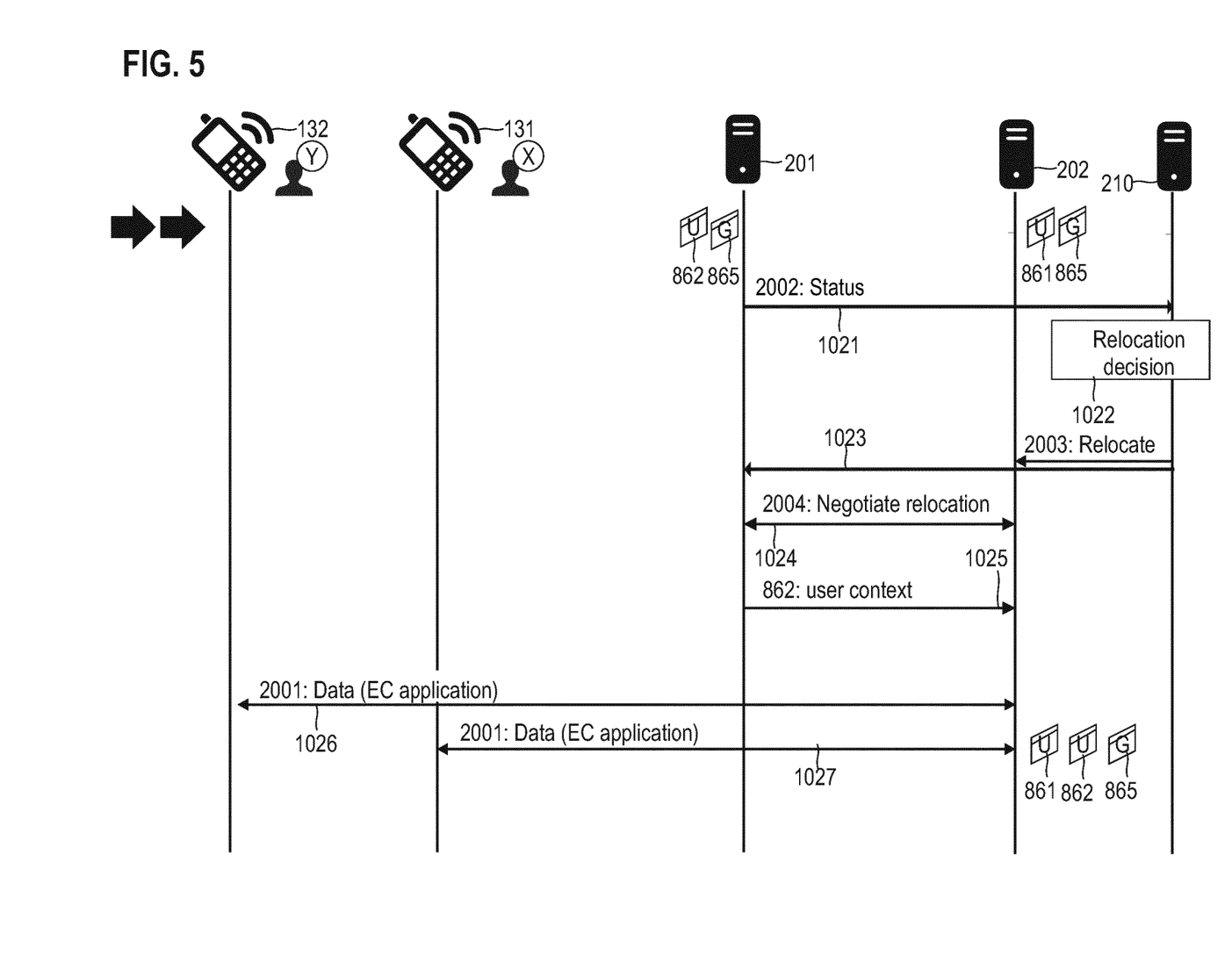
FIG. 5 is a signaling diagram associated with relocation of an EC application from a source EC server to a target EC server according to various examples.

FIG. 5 is a signaling diagram illustrating aspects with respect to partial relocation of an EC application. The scenario of FIG. 5 can be implemented as an extension of the scenario of FIG. 4. Hence, the signaling according to FIG. 5 may begin upon completion of the signaling according to FIG. 4 (as indicated by the arrows in FIGS. 4 and 5).

Thus, initially, in the scenario of FIG. 5, the EC application is executed at the source EC server 201 for the user Y of the UE 132 based on the user context 862 and the group context 865. The EC application is also executed at the target EC server 202 for the user X of the UE 131 based on the user context 861 and the group context 865. Both, the source EC server 201, as well as the target EC server 202 host the EC application.

1021-1023 generally correspond to 1003-1005, this time for user Y of UE 132. Specifically, at 1022, a relocation decision for the user Y is taken.

As such, 1024 corresponds to 1006, and a preparation for relocating the user context 862 is taken.

At 1025, the user context 862 is relocated from the source EC server 201 to the target EC server 202.

The control signaling 2004 at 1024 can again be used to determine whether the group context 865 is already available to the target EC server 202. In the scenario of FIG. 5, the group context 865 is already available to the target EC server 202. Hence, there is no need for the source EC server 201 again providing the group context 865, or the target EC server 202 again obtaining the group context 865.

Furthermore, due to synchronization (cf. FIG. 4: 1011), the group context 865 available to the target EC server 202 is up-to-date (while in FIGS. 4 and 5 synchronization is indicated at 1011, for sake of simplicity, using a single repetition of the control signaling 2006, generally, multiple repetitive instances of control signaling 2006 for synchronization are possible, to provide up-to-date group contexts 865 at the participating EC servers 201, 202).

In response to relocating the user context 862 at 1025, the source EC server 201 is not required to serve any remaining users. The EC application has now fully been relocated. Hence, in response to relocating the user context 862 at 1025, execution of the EC application at the source EC server 201 is stopped. The source EC server 201 does not anymore host the EC application. Corresponding resources may be released or cleared.

Further, there is no need to update or maintain the group context 865. Respective resources can be released or cleared. The group context 865 could be deleted at the source EC server 201. Then, also the synchronization of the group context 865 between the source EC server 201 and the target EC server 202 stops.

Finally, the target EC server 202 executes the EC application for the user X of the UE 131 and the user Y of the UE 131, based on the user context 861, the user context 862, as well as based on the group context 865. Corresponding application data 2001 is communicated at 1026, 1027 between the UE 131 and the target EC server 202 and between the UE 132 and the target EC server 202.

As will be appreciated from FIGS. 4 and 5, scenarios have been described in which the group context is not fully relocated initially, but rather copied from the source EC server 201 to the target EC server 202. In other scenarios, it would also be possible to move the group context 865 from the source EC server 201 to the target EC server 202. Such a scenario may be applicable where full relocation of the EC application from the source EC server 201 to the target EC server 202 is desired.

Figure 6:
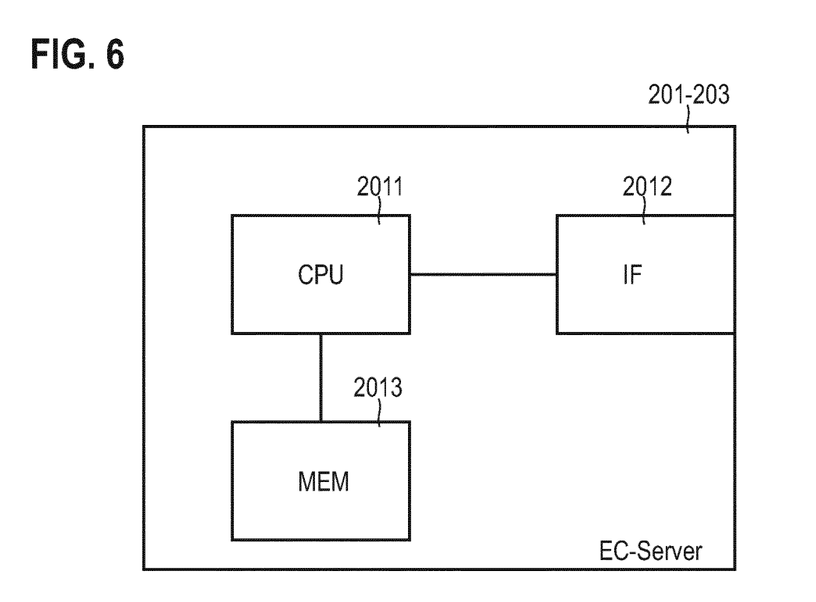
FIG. 6 schematically illustrates an EC server according to various examples.

FIG. 6 illustrates aspects with respect to the EC servers 201-203. The EC server 201-203 includes control circuitry, implemented, in FIG. 6, by a processor 2011, an interface 2012, and a memory 2013. Communication with other nodes is possible via the interface 2012. Program code can be stored in the memory 2013 and then be executed by the processor 2011. Executing the program code causes the processor 2011 to perform techniques as described herein, e.g.: executing an EC application; partly or fully relocating an EC application; relocating user contexts; copying and/or relocating (providing) group contexts, synchronizing group contexts, etc.

Figure 7:
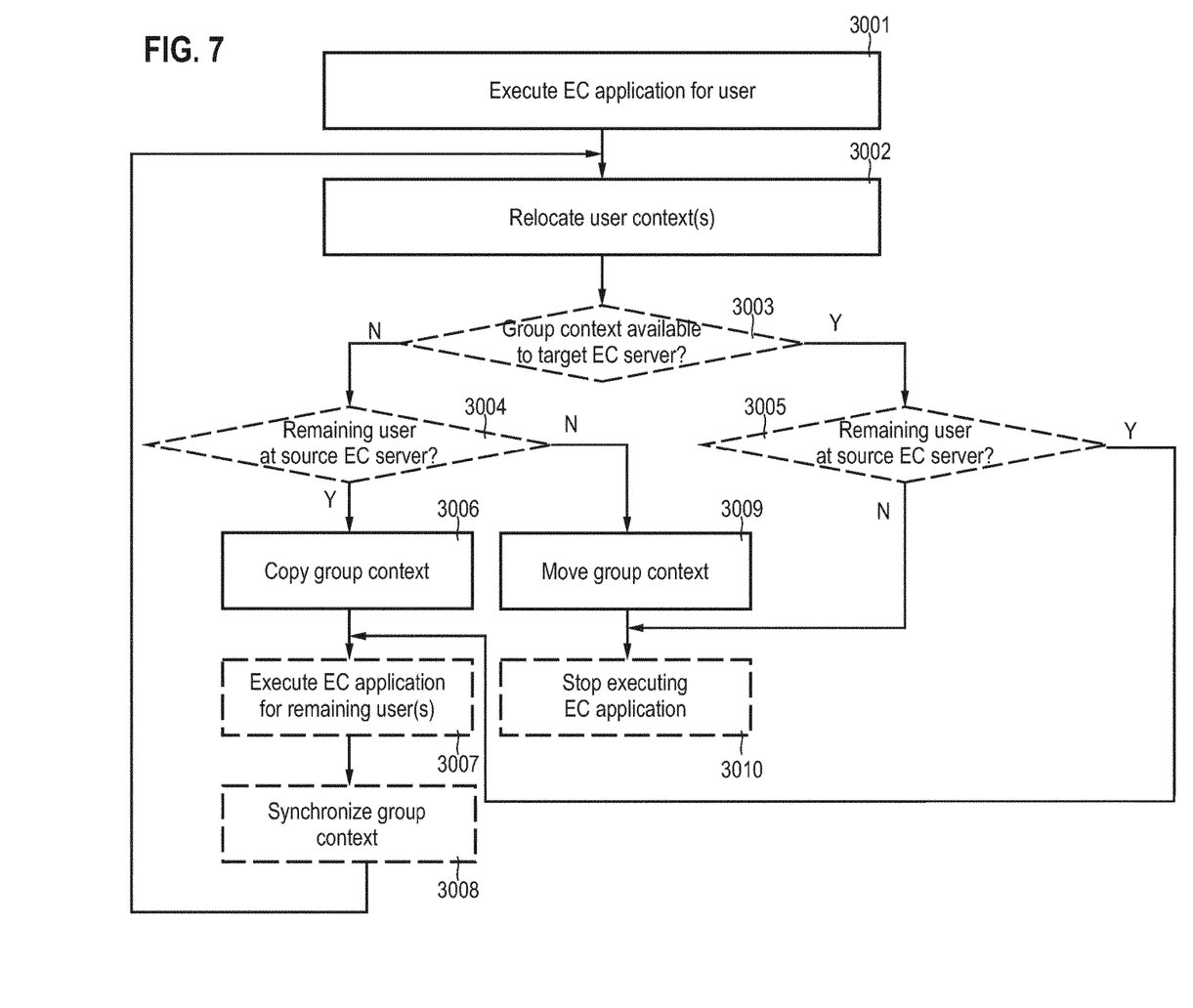
FIG. 7 is a flowchart of a method according to various examples.

FIG. 7 is a flowchart of a method according to various examples. For example, the method according to FIG. 7 may be executed by the control circuity 2011-2013 of an EC server 201-203 (cf. FIG. 6). This EC server acts as source EC server.

At block 3001, the EC application is executed for multiple users. The EC application is a multi-user EC application.

The EC application, at block 3001, is executed based on user contexts for each user, and further based on a group context. Values of group-specific parameters of the group context are shared between executing the EC application for different users; while values of user-specific parameters of the user contexts are different from user to user.

Next, at block 3002, one or more user contexts are relocated (cf. FIG. 4: 1007; FIG. 5: 1025). Relocating can include control signaling between the source EC server and a target EC server of the relocation.

As a general rule, various trigger criteria for relocating one or more user contexts at block 3002 are available, e.g., mobility measurements, load balancing, resilience operation, etc.

Next, at optional block 3003, it is determined whether the group context of the multi-user EC application is available to the target EC server, to which the one or more user contexts have been relocated at block 3002. Block 3003 may involve respective control signaling between the source EC server and the target EC server (cf. FIG. 4: 1006; and FIG. 5: 1024).

In response to the determining at block 3003 being negative, at optional block 3004, it is checked whether any users remain being served by the source EC server, block 3004. For example, if, at block 3002, the user contexts of all users of the EC application have been relocated, then, at block 3004, no remaining users are detected. Such a scenario would correspond to a full relocation of the EC application. In such a scenario, at block 3009, the group context is moved from the source EC server to the target EC server: it is not required to maintain multiple instances of the group context.

At block 3010, next, execution of the EC application can be stopped at the source EC server. Corresponding resources may be released or cleared at the source EC server. Hence, the EC application has been fully relocated from the source EC server to the target EC server.

If, however, at block 3004, it is judged that users remain to be served by the source EC server, then, at block 3006, the group context is copied. Hence, instances of the group context are available to, both, the source EC server as well as the target EC server. Both act as hosts for the EC application. This scenario corresponds to a partial relocation of the EC application.

At block 3007, the EC application is executed for any users remaining at the source EC server. This is based on the respective user context(s) and the group context.

At block 3008, multiple instances of the group context are synchronized between the source EC server and the target EC server. This is to implemented up-to-date group contexts at, both, the source EC server and the target EC server. 3008 may include repetitive control signaling to provide freshness of the group context.

Eventually, block 3002 can be executed at some point in time.

If, at block 3003, it is judged that the group context is already available to the target EC server, optional block 3005 is executed. Block 3005 corresponds to block 3004.

If at block 3005 it is judged that no users remain being served by the source EC server, then, at block 3010, execution of the EC application at the source EC server stops. Otherwise, at block 3007, execution of the EC application for the remaining users commences.

As will be appreciated, overhead control signaling is avoided by determining whether the group context is already available to the target EC server, at block 3003, and conditionally executing in 3006 and 3009.

Figure 8:
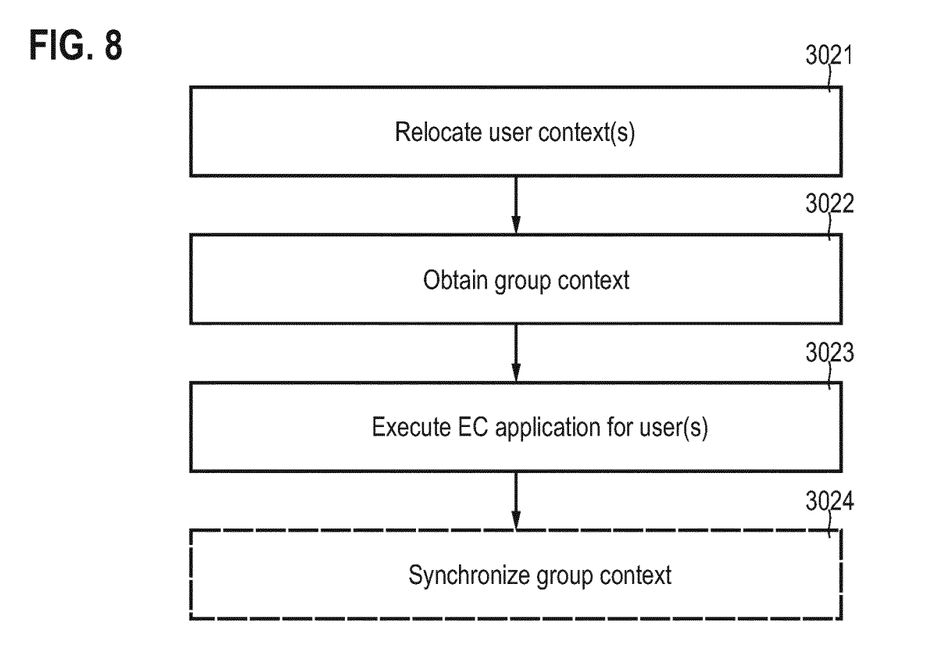
FIG. 8 is a flowchart of a method according to various examples.

FIG. 8 is a flowchart of a method according to various examples. For example, the method of FIG. 8 could be executed by the control circuity 2011-2013 of the EC server 201-203 of FIG. 6. The executing EC server may act as a target EC server. As such, the method of FIG. 8 may be inter-related to the method of FIG. 7.

At block 3021, one or more user contexts are relocated to a target EC server from a source EC server. As such, block 3021 can be inter-related with 3002 of FIG. 7.

Next, at block 3022, a group context is obtained. This may include copying the group context (cf. FIG. 7; block 3006) or moving the group context (cf. FIG. 7: block 3009).

Next, at block 3023, the EC application is executed for one or more users for which the user contexts have been relocated at block 3021, based on the one or more user contexts and the group context of block 3022.

In optional block 3024, the group context is synchronized between the source EC server and the target EC server. As such, block 3024 can be inter-related with the block 3008 of FIG. 7.

Although the invention has been shown and described with respect to certain preferred embodiments, equivalence and modifications will occur to others skilled in the art upon the reading and understanding of the specification. The present invention includes all such equivalence and modifications and is limited only by the scope of the independent claims.

For example, various scenarios have been described with respect to an intra-EC-System relocation of an EC application, i.e., from a source EC server to a target EC server of the same EC system. Similar scenarios may be readily applied with respect to inter-EC-System relocation.

For further illustration, above, various scenarios have been described in which a group context is provided by a source EC server by copying the group context. Similar scenarios may be readily applied with respect to a scenario in which the group context is provided by the source EC server by moving the group context to a target EC server. Here, resources previously associated with the group context at the source EC server may be cleared in response to moving of the group context.

For still further illustration, various scenarios have been described above with respect to EC in connection with a cellular network. However, similar scenarios may be readily applied to other kinds and types of networks, e.g., a fixed-wire local area network, etc.

For still further illustration, various examples have been described in which two EC servers host a multi-user EC application contemporaneously. As a general rule, more than two EC servers may co-host a multi-user EC application.

The invention claimed is:

1. A method of operating a source edge computing server of an edge-computing system, the method comprising:
   executing a multi-user edge computing application between the source edge computing server and a first user equipment (UE) for a first user and between the source edge computing server and a second UE for a second user based on:
   a first user context of the first user comprising a first set of parameters having values specific to the multi-user edge computing application being executed for the first user between the first UE and the source edge computing server;
   a second user context of the second user comprising a second set of parameters having values specific to the multi-user edge computing application being executed for the second user between the second UE and the source edge computing server; and
   a group context of the first user and the second user comprising croup parameters having values shared between the first and second users available to the source edge computing server for executing the multi-user edge computing application for the first and second users between the first and second UEs and the source edge computing server;

relocating the first user context from the source edge computing server to a target edge computing server; and providing the group context from the source edge computing server to the target edge computing server.

2. The method of claim 1, further comprising:

determining whether the group context is available to the target edge computing server, wherein the providing of the group context to the target edge computing server is performed in response to determining the group context being unavailable to the target edge computing server.

3. The method of claim 2, further comprising:

control signaling between the source edge computing server and the target edge computing server to determine whether the group context is available to the target edge computing server.

4. The method of claim 1, wherein:

providing the group context comprises copying the group context from the source edge computing server to the target edge computing server.

5. The method of claim 1, further comprising:

synchronizing the group context between the source edge computing server and the target edge computing server.

6. The method of claim 5, further comprising:

stopping executing the multi-user edge computing application for the first user in response to relocating the first user context;

relocating the second user context to the target edge computing server; and in response to said relocating of the second user context, stopping executing the multi-user edge computing application for the second user and stopping synchronizing the group context between the source edge computing server and the target edge computing server.

7. A method of operating a target edge computing server of an edge computing system, comprising:

relocating a first user context of a first user of a multi-user edge computing application from a source edge computing server to the target edge computing server, the first user context comprising a first set of parameters having values specific to the multi-user edge computing application being executed for the first user between a first UE and the source edge computing server;

obtaining a group context of the first user and of a second user of the multi-user edge computing application from the source edge computing server, the group context comprising group parameters having values shared between the first and second users for the multi-user edge computing application being executed for the first and second users between the source edge computing server and the first UE of the first user and a second UE of the second user and the; and executing the multi-user edge computing application for the first user based on the first user context and the group context available to the target edge computing server.

8. The method of claim 7, further comprising:

sharing the values of the group parameters of the group context between edge computing servers executing the multi-user edge computing application for the first user; and executing the multi-user edge computing application for the second user.

9. A source edge computing server of an edge computing system, the source edge computing server comprising control circuitry configured to perform:

executing a multi-user edge computing application between the source edge computing server and a first user equipment (UE) for a first user and between the source edge computing server and a second UE for a second user based on a first user context of the first user comprising a first set of parameters having values specific to the multi-user edge computing application being executed for the first user between the first UE and the source edge computing server, a second user context of the second user comprising a second set of parameters having values specific to the multi-user edge computing application being executed for the second UE and the source edge computing server, and a group context of the first user and the second user comprising group parameters having values shared between the first and second users available to the source edge computing server for executing the multi-user edge computing application for the first and second users between the first and second UEs and the source edge computing server;

relocating the first user context from the source edge computing server to a target edge computing server; and providing the group context from the source edge computing server to the target edge computing server.

10. A target edge computing server of an edge computing system, the target edge computing server comprising control circuitry configured to perform:

relocating a first user context of a first user of a multi-user edge computing application from a source edge computing server to the target edge computing server, the first user context comprising a first set of parameters having values specific to the multi-user edge computing application being executed for the first user between a first user equipment (UE) of the first user and the source edge computing server;

obtaining a group context of the first user and of a second user of the multi-user edge computing application from the source edge computing server, the group context comprising group parameters having values shared between the first and second users available to the source edge computing server for executing the multi-user edge computing application for the first and second users between the first UE and a second UE of the second user and the source edge computing server; and executing the multi-user edge computing application for the first user based on the first user context and the group context available to the target edge computing server.

* * * * *